3,056,792
UNSYMMETRICAL 1,3-DIAMINO-2-PROPANOLS
Charles F. Geschickter, Kensington, Md., John S. Pierce, Richmond, Va., and Ebenezer E. Reid, Baltimore, Md., assignors to The Geschickter Fund for Medical Research, Inc., Washington, D.C., a corporation of New York
No Drawing. Original applications June 4, 1958, Ser. Nos. 739,665 and 739,681. Divided and this application Sept. 14, 1960, Ser. No. 55,866
4 Claims. (Cl. 260—288)

This invention relates to unsymmetrical 1,3-diamino-2-propanols and, more particularly, to certain methylcyclohexylamino and piperidino derivatives of such propanols.

One group of compounds to which the instant application is directed is

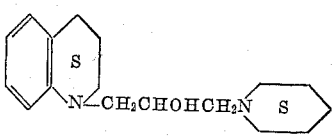

(A)

and its non-toxic acid addition salts. Compounds having structures similar to compound (A) have been suggested in the past. For example, Wiselogle (Survey of Anti-Malarial Drugs, volume II, part I, page 670, 1946) discloses 1-(1,2,3,4-tetrahydroquinolyl)-3-(diethylamino)-2-propanol. This compound has been used by applicants in scores of clinical tests and has been found, particularly when salted with thiodisalicylic acid, to be useful in the treatment of arthritis. The use of this compound has been discontinued, however, due to the fact that after use of the compound for a period of several weeks, both alone and in the presence of thiodisalicylic acid, a number of patients broke out in a skin rash.

Compound (A), on the other hand, has been found to have a multiplicity of uses, including utility for the treatment of arthritis, with no undesirable side effects such as are observed in connection with the diethylamino compound of Wiselogle.

In addition to compound (A), this application is also directed to the following compound and its non-toxic acid addition salts:

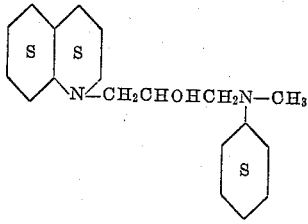

(B)

Compound (B) is particularly useful as a transquilizing agent and, as in the case of compound (A), will not cause a rash of the type induced by the Wiselogle compound discussed above when administered to patients over a period of time. Compound (B) has still additional uses which will be mentioned at a later portion of this application.

It is accordingly a primary object of the present invention to provide unsymmetrical 1,3-diamino-2-propanols and non-toxic acid addition salts thereof which are particularly useful for therapeutic purposes and yet which have no undesirable side effects on patients to whom they are administered.

It is another principal object of the present invention to provide a 1,3-diamino-2-propanol and non-toxic acid addition salts thereof which are useful as muscle relaxants and anti-spasmodics which may be used as intermediates to form quaternary ammonium salts which are effective germicides, and which may also be used to make azo-type dyes.

It is still another object of the present invention to provide a compound of the structure

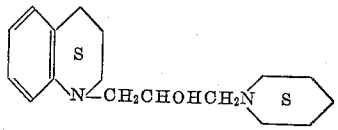

and its non-toxic acid addition salts.

It is a further object of the present invention to provide a 1,3-diamino-2-propanol and its non-toxic acid addition salts which are useful to induce tranquilizing and antipyretic effects.

It is an additional object of the present invention to provide a compound of the structure:

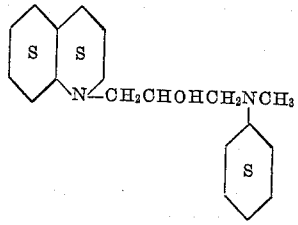

and its non-toxic acid addition salts.

Compound (A) may conveniently be prepared by reacting a compound of the formula 3-[1-(1,2,3,4-tetrahydroquinolyl)]-1,2-epoxypropane with piperidine under controlled reaction conditions. The following examples are illustrative of such procedure:

EXAMPLE 1

3-[1-(1,2,3,4-Tetrahydroquinolyl)]-1,2-Epoxypropane

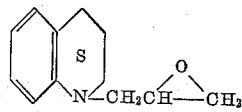

(C)

Two moles of epichlorohydrin and 5 ml. of water are added to one mole of tetrahydroquinoline. The mixture is heated in a round bottom flask for 5 hours at approximately 55°, with frequent shaking. (Note: All temperatures in this specification are on the centigrade scale and are uncorrected.) The excess epichlorohydrin is removed by vacuum evaporation from a water bath at approximately 55° and at about 20 mm. pressure. The residue is dissolved in 200 ml. of 95% ethanol. One mole of potassium hydroxide, dissolved in 60 ml. of water, is then added. The mixture is shaken with frequent cooling for 45 minutes, the temperature being kept below 35°. Without purification, the crude epoxide (having the formula of compound (C) above) is caused to react with piperidine as described in Example 2 below.

EXAMPLE 2

1-[1-(1,2,3,4-Tetrahydroquinolyl)]-3-(N-Piperidino)-2-Propanol

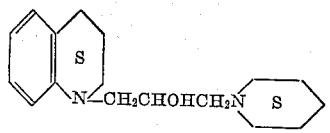

(A)

A mixture of approximately 0.25 mole of crude 3-[1-(1,2,3,4-tetrahydroquinolyl)] - 1,2 - epoxypropane (prepared as in Example 1) and 0.25 mole of piperidine is allowed to stand overnight and then is heated at 60–65° for 5 hours. The reaction mixture is treated with 500 ml. of water and is extracted with 200 ml. of ether, the aqueous layer being discarded. The ether layer is extracted with excess N hydrochloric acid, so that the aqueous layer has a pH of about 3. The aqueous layer is separated and is gradually treated with a base to adjust the pH to about 5.5. The reaction mixture is extracted with 100 ml. of ether and the ether is discarded. The lower aqueous layer is made strongly basic and is extracted with two 100 ml. portions of ether. The combined ether extracts are filtered and the ether is removed by vacuum evaporation. The residue is vacuum distilled. About 36% of theory of the desired product, compound (A), is obtained, most of the product boiling at approximately 178–179° at 0.40 mm. pressure.

As may be seen from the above, the yield of compound (A) is approximately 36% of theory using the crude 3-[1-(1,2,3,4-tetrahydroquinolyl)] - 1,2 - epoxypropane of Example 1. This yield may be significantly increased by prepurification of the product of Example 1 prior to the piperidine reaction, as may be seen in the following example:

EXAMPLE 3

*1-[1-(1,2,3,4-Tetrahydroquinolyl)]-3(N-Piperidino)-2 Propanol*

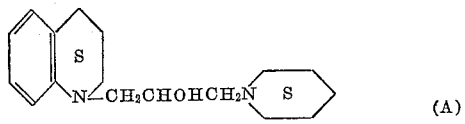

A mixture of 28.4 g. (0.15 mole) of distilled 3-[1-(1,2,3,4-tetrahydroquinolyl)] - 1,2 - epoxypropane (B.P. 118–120° at 0.06 mm.) and 21.3 g. (0.25 mole) of piperidine is allowed to stand at room temperature for 24 hours and is heated gently on a sand bath for 16 hours. The reaction mixture is vacuum distilled. The yield of compound (A) (boiling at approximately 162–163° at 0.05 mm. pressure) is 34.6 g. 84% of theory).

Methods of preparing compound (B) are set forth in Examples 4 and 5. As will be noted, either trans-decahydroquinoline or a cis-trans mixture may be employed to prepare compound (B).

EXAMPLE 4

*1-(1-Trans-Decahydroquinolyl)-3-(Methylcyclohexylamino)-2-Propanol*

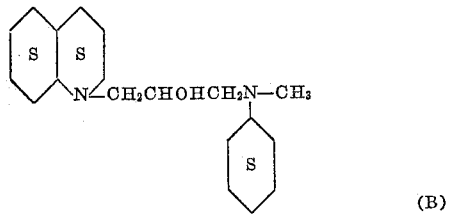

trans (B)

A solution of 39.2 g. (0.28 mole) of trans-decahydroquinoline and 49.9 g. (0.28 mole) of 3-(methylcyclohexylamino)-1,2-epoxypropane in 100 ml. of 95% ethanol is allowed to stand at room temperature for 16 hours and then is heated on a water bath for 8 hours. After being permitted to stand for four days at room temperature, the reaction mixture is distilled under reduced pressure. 68 g. (79%) of the title compound are obtained, boiling at 172–174° at 0.65 mm. pressure.

EXAMPLE 5

*1-(Decahydroquinolyl)-3-(Methylcyclohexylamino)-2-Propanol*

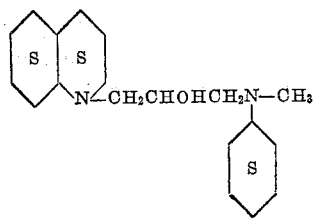

(B)

A mixture of 0.10 mole each of 3-(methylcyclohexylamino) - 1,2 - epoxypropane and a commercial cis-trans mixture of decahydroquinoline (obtained from Distillation Products Industries) is allowed to stand in a 125 ml. Erlenmeyer flask for two days and then is heated gently on a sand bath for 10 hours. The reaction mixture, after being permitted to cool to room temperature, is treated with 300 ml. of 2 N hydrochloric acid. The acid solution thus formed is extracted with 150 ml. of ether and the ether layer is discarded. The aqueous layer is made strongly basic and the oil formed is extracted with 200 ml. of ether. The ether solution is washed with three 500 ml. portions of water and filtered. The ether is removed by vacuum evaporation and the residue is vacuum distilled. Eighteen g. (58% of theory) of 1-decahydroquinolyl - 3 - (methylcyclohexylamino)-2-propanol is obtained, boiling at 172–174° at 0.45 mm.

Compounds (A) and (B) are strongly basic and thus may be converted into stable addition salts (for ease of administration to patients) with acids, including weak ones such as acetic acid. Examples of stable non-toxic salts are the hydrochlorides, phosphates, sulfates, acetates, lactates, thiodisalicylates, mucates, citrates, maleates, tartrates and the like. The hydrochloride phosphate, sulfate, acetate, lactate, citrate, maleate and tartrate of each of compounds (A) and (B) are readily soluble in water. The thiodisalicylates dissolve in a solution of propylene glycol and water in a volume ratio of 2/1. The mucates can be used in the form of capsules or in aqueous solution, in which they are readily soluble.

In general, those non-toxic salts of compounds (A) and (B) which are soluble in water or other well tolerated solvents such as the propylene glycol-water solvent referred to are particularly useful for therapeutic purposes, due to the ease of administration of the salts in their dissolved form.

By way of example, details of the preparation of the thiodisalicylate and mucate of compound (A) are given below.

EXAMPLE 6

The mucate,

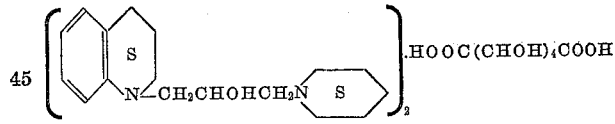

is obtained as a white crystalline powder by reaction of compound (A) with mucic acid in ethanol solution. In a typical run, a mixture of 40 g. (0.19 mole) of mucic acid and 104 g. (0.38 mole) of compound (A) is heated gently with stirring in 1 liter of 95% ethanol for 20 minutes. The white crystalline precipitate, having a melting point of 159–160° C., is filtered with suction, washed with ether and alcohol and dried in a vacuum desiccator.

EXAMPLE 7

The thiodisalicylate,

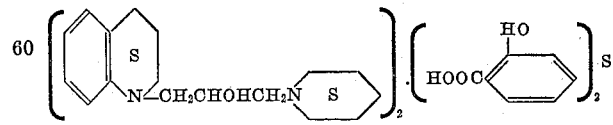

is obtained as a gum by reaction of 2 parts of compound (A) and 1 part of thiodisalicylic acid in 12 parts (all by weight) of absolute alcohol and by treatment with ether. A crystalline, light tan powder is obtained by trituration with ether and recrystallization of the solid thus formed from acetone and petroleum ether (B.P. 65–110° C.). The salt sinters at 93° C. and melts at 99° C.

Compound (A) is an effective muscle relaxant and antispasmodic. A particularly advantageous use of the compound is as a relaxant of visceral muscle, although in rabbits in high dosage, it tends to have a curare like action, affecting voluntary muscle. As a result of the above properties, compound (A) is useful in the treatment of such conditions as gastrointestinal spasm, irritable bladder, dysmenorrhea, arthritis, diverticulitis, for the relief of constipation, abdominal cramps, hypertension, etc. In addition, compound (A) can be used without producing undesirable side effects such as the skin rash caused by prior art compounds as heretofore discussed.

The LD50 of compound (A) is 125 mg./kg. It is made up in a solution of 50 mg./ml., the dosage being 1 to 1.5 ml. by intramuscular injection. For both injection and oral use, compound (A) may be given as the free base, as the free base in a non-toxic, non-irritating medium such as a 50% sesame oil solution, as a water soluble salt or as a salt which is not appreciably soluble in water. A convenient way to administer compound (A) is in the form of a water soluble salt as the hydrochloride, in a syrup containing 50 mg. of the free base per ml., in which case the dose should be from 1.5 to 3.0 ml.

Compounds (A) and (B) can also be quaternized in a well known manner to form quaternary salts. The quaternary derivatives of compound (A) made from octyl bromide and decyl bromide are particularly effective germicidal agents.

Compound (B) has mild antipyretic effects in the rat. Clinically, it is useful as a tranquilizer, having the distinct advantage of causing no drowsiness. This compound distinctly helps the patient to work in stressful situations without the usual accompanying anxiety. It diminishes aggressiveness.

Compound (B) may be administered to patients in a form and manner similar to those set forth above in connection with compound (A), the dosages for the two compounds being approximately the same. The LD50 of compound (B) is 100 mg./kg. Capsules of 45 mg. of the free base may be given three times daily.

In addition to the above, compounds (A) and (B) each forms a penicillin salt when an ether solution of penicillin is added to an ether solution of the respective compound.

Furthermore, each of compounds (A) and (B) has potential use as an intermediate in the synthesis of pharmaceuticals. Thus, both of these compounds may theoretically be quaternized with decamethylene bromide to form a class of compounds of the general formula

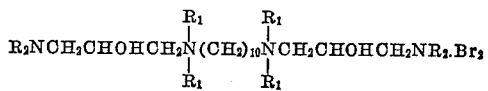

a class of compounds having potential curariform activity.

Compound (A) may undergo still additional useful reactions. For example, it may be coupled with benzene diazonium chloride and with the tetrazotized derivative of benzidine to give dyes which are soluble in ether and which can be used to dye wool, silk and cotton cloths.

This application is a division of applications Serial Nos. 739,665 and 739,681, both filed June 4, 1958, and now abandoned.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1.

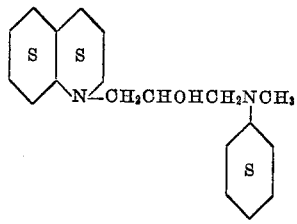

2. The non-toxic acid addition salts of the compound defined in claim 1.

3.

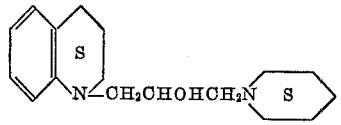

4. The non-toxic acid addition salts of the compound defined in claim 3.

References Cited in the file of this patent
UNITED STATES PATENTS
2,786,845    Mauss et al. _____ Mar. 26, 1957

OTHER REFERENCES

Wiselogle: Survey of Anti-Malarial Drugs, vol. II, part I, pages 670–71 (1946).